United States Patent
Ramanathan et al.

(10) Patent No.: US 8,301,879 B2
(45) Date of Patent: Oct. 30, 2012

(54) CONVERSATION RIGHTS MANAGEMENT

(75) Inventors: Rajesh Ramanathan, Redmond, WA (US); William Looney, Seattle, WA (US); Avronil Bhattacharjee, Redmond, WA (US); Amit Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 12/359,485

(22) Filed: Jan. 26, 2009

(65) Prior Publication Data

US 2010/0189260 A1    Jul. 29, 2010

(51) Int. Cl.
*H04L 29/06* (2006.01)
(52) U.S. Cl. .................... 713/156; 380/255
(58) Field of Classification Search .............. 713/156; 380/255, 256, 259
See application file for complete search history.

(56) References Cited

U.S. PATENT DOCUMENTS

| | | | |
|---|---|---|---|
| 5,717,869 A | 2/1998 | Moran et al. | |
| 6,609,199 B1* | 8/2003 | DeTreville | 713/172 |
| 7,142,648 B1 | 11/2006 | Miller | |
| 7,240,366 B2* | 7/2007 | Buch et al. | 726/14 |
| 7,382,879 B1* | 6/2008 | Miller | 380/201 |
| 7,822,820 B2* | 10/2010 | LeVasseur et al. | 709/206 |
| 2002/0078153 A1* | 6/2002 | Chung et al. | 709/204 |
| 2005/0021761 A1* | 1/2005 | Thomas | 709/227 |
| 2005/0187879 A1 | 8/2005 | Zigmond et al. | |
| 2006/0149822 A1* | 7/2006 | Henry et al. | 709/206 |
| 2006/0178160 A1 | 8/2006 | Hans et al. | |
| 2007/0003065 A1 | 1/2007 | Schwartz et al. | |
| 2008/0002820 A1* | 1/2008 | Shtiegman et al. | 379/211.02 |
| 2008/0120381 A1* | 5/2008 | Awan et al. | 709/206 |
| 2008/0162934 A1 | 7/2008 | Okawa | |
| 2008/0301436 A1 | 12/2008 | Yao et al. | |
| 2009/0180614 A1* | 7/2009 | Rajagopal et al. | 380/228 |
| 2009/0307361 A1* | 12/2009 | Issa et al. | 709/229 |

FOREIGN PATENT DOCUMENTS

WO    2008084309 A2    7/2008

OTHER PUBLICATIONS

Rajesh Ramantahan; Ofice communications Server, How Presence Powers OCS 2007; pp. 1-8; 2008.*
"PhoneCrypt GSM Mobile Phone Encryption Software", Retrieved at<<http://www.securstar.com/products_phonecrypt.php>>, Dec. 31, 2008, pp. 3.
Bian, et al."Off-the-Record Instant Messaging for Group Conversation", Retrieved at<<http://ieeexplore.ieee.org/Xplore/login.jsp?url=iel5/4296570/4296571/04296601.pdf?temp=x>>, 2007 IEEE, pp. 79-84.
Borisov, et al."Off-the-Record Communication, or, Why Not to Use PGP", Retrieved at<<http://www.cypherpunks.ca/otr/otr-wpes.pdf>>, WPES'04, Oct. 28, 2004, pp. 8. Hillesum Bob,"Het BlackBerry Forum", Retrieved at<<http://blackberry-nl.com/index.php?action=printpage; topic=3086.0>>, Nov. 30, 2008, pp. 3.
"Microsoft Office Protocol Documents", Retrieved at<<http://msdn.microsoft.com/en-us/library/cc307432.aspx>>, Dec. 31, 2008, pp. 7.
"International Search Report", Mailed Date: Aug. 25, 2010, Application No. PCT/US2010/020779, filed Date: Jan. 12, 2010, pp. 10.

* cited by examiner

*Primary Examiner* — Samson Lemma
(74) *Attorney, Agent, or Firm* — Turk IP Law, LLC

(57) ABSTRACT

Conversation rights for multi-modal communications are managed and enforced in an enhanced communication system. Through physical and/or software components, rights are assigned to a communication session and related components upon user request. Permitted participants of the session are provided access tools such as decryption keys. Restrictions based on the assigned conversation rights are extended to preserved recordings and associated documents of the communication session.

20 Claims, 7 Drawing Sheets

CONVERSATION RIGHTS MANAGEMENT

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

A number of such modern communications are multi-modal, meaning multiple modes of communication such as voice, data, video, and comparable ones may be employed in a single communication session to complement each other. All or a portion of the different communication modes used in a session may be real time. For example, voice and video communications in a white-board assisted conference call may be real time, while the white-board data sharing may be real time or based on stored data. Another capability of modern systems is that conversation sessions may be preserved and made available in whole or partially. For example, documents shared in a video conference may be stored in a searchable fashion along with a recording of the conference. This presents a challenge regarding user rights on the records of multi-modal communication sessions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing rights management for multi-modal communications. Through physical and/or software components, multi-modal communication sessions may be preserved based on default or user defined rights attributes in portion or in entirety. Access to preservation of actual records of various modes of a communication session as well as associated documents/data may be limited based on assigned rights attributes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
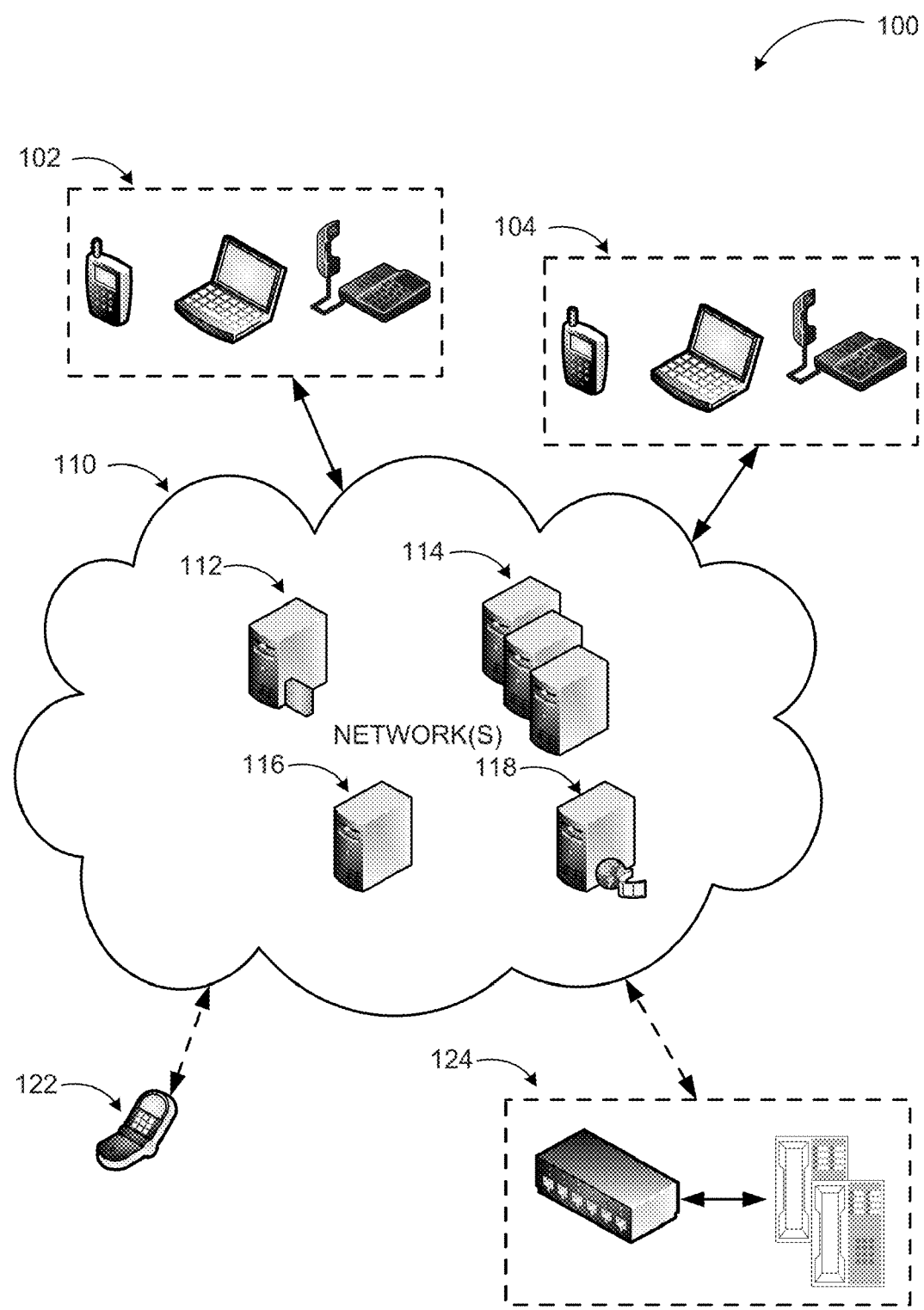
FIG. 1 is a diagram illustrating an example unified communications system, where embodiments may be implemented for conversation rights management.

As briefly described above, conversation rights may be managed by components of a communication system placing access restrictions on preserved components of conversation sessions. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing conversation rights. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

A conversation as used herein refers to a multimodal communication session, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode. Other subscribers may join or leave the conversation other modes and devices may be added or removed. The commonality between these communications is preserved by designating all these communications as belonging to the same conversation. Conversations may be assigned a unique identifier, which enables subscribers to view, record, modify, share, and generally manage aspects of the conversation including documents and other data associated with the conversation (e.g. documents exchanged as attachments in one mode of the conversation or recordings of other modes of the conversation).

Conversation rights assigned or selected for a particular communication session or one or more modes of a communication session may be managed and enforced by one of the UC servers 114 in the UC system as mentioned above. According to some embodiments, the conversation rights may be managed by a digital rights management server. A digital rights management server may coordinate encryption of data exchanged during a conversation (the communications themselves as well as any associated data such as attached or generated documents). Participants may be issued decryption keys based on their permission levels to protect aspects of the conversation while it occurs or after it has been preserved. SIP may be employed to facilitate encryption based or otherwise management of the rights to the conversation.

As discussed above, the rights management server component of the UC servers 114 and an encryption mechanism for scrambling real time communications may be employed to assign and enforce restriction rights on the communications and its components. For example, secure RTP keys from the rights management server may be used for encryption, a trust component may ensure that off-the-record or right managed conversations are only held between client endpoints that conform to the media rights management technologies. The solution may also leverage SIP to transport various rights management information for a session, and allow SIP to be used either pre-session or mid-session. Various user interface (UI) artifacts providing end-to-end experience may be associated with using rights management, such as restricting copy/paste, or applying rights management information from documents when they are part of a document sharing session.

While the example system in FIG. 1 has been described with specific components such as mediation server, A/V server, and similar devices, embodiments are not limited to this system of the example components and configurations. A service for conversation rights management may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
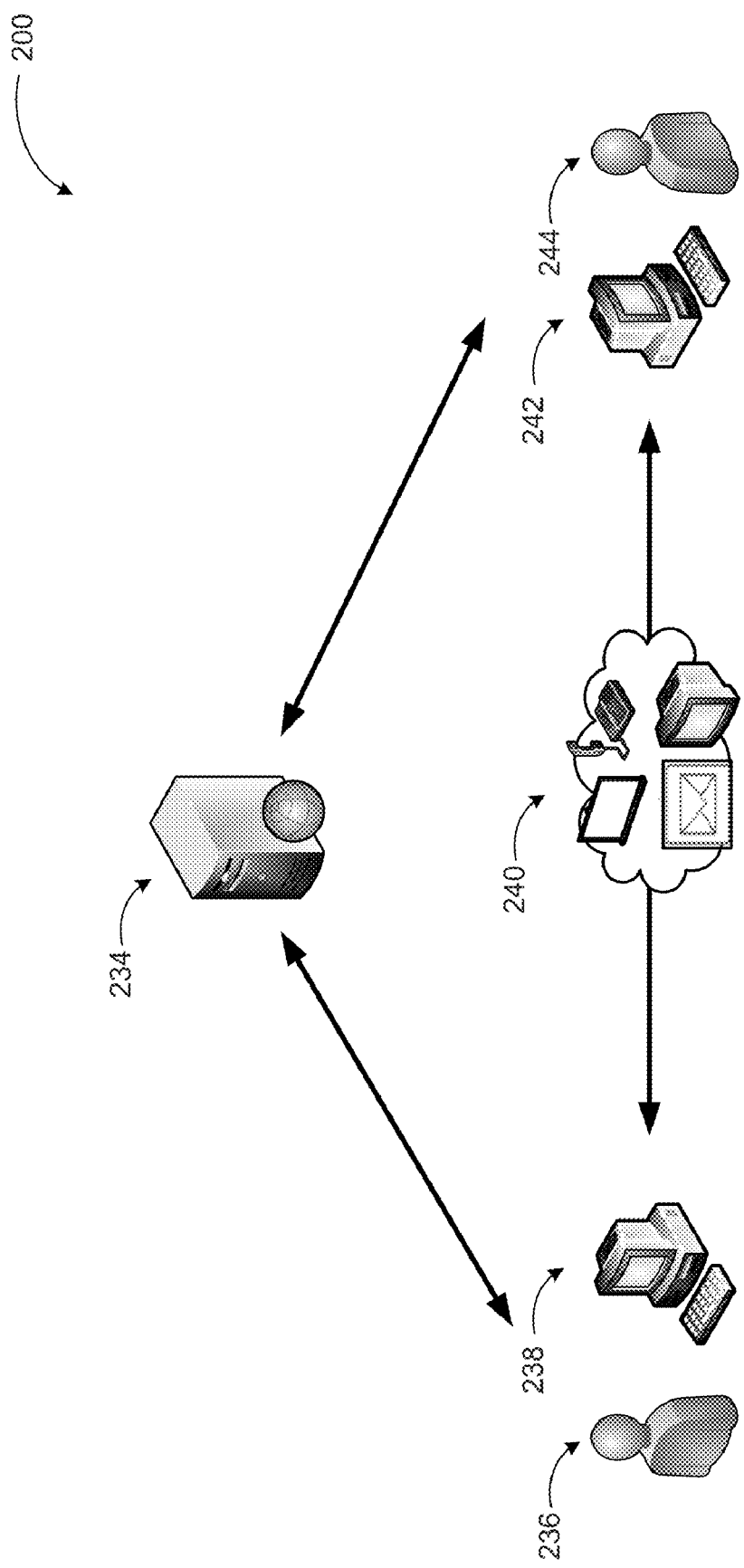
FIG. 2 is a conceptual diagram illustrating a basic example system for managing rights to components of a communication session.

FIG. 2 is a conceptual diagram 200 illustrating a basic example system for managing rights to components of a communication session. While a system according to embodiments is likely to include a number of servers, client devices, and services such as those illustratively discussed in FIG. 1, only those relevant to embodiments are shown in FIG. 2.

As discussed previously, a capability of modern communication systems is that conversation sessions may be preserved and made available in whole or partially. For example, documents shared in a video conference may be stored in a searchable fashion along with a recording of the conference. This presents a challenge regarding user rights on the records of multi-modal communication sessions. Another aspect of such multi-modal communication sessions is that some or all of the modes may be personal or otherwise confidential and users or organizations may wish to preserve a restriction attribute associated with the particular mode or all of the conversation when the session is stored/archived.

According to some embodiments, Session Initiation Protocol (SIP) may be used to set up a comprehensive solution to manage conversation rights by ensuring that the real time multi-modal conversation content is encrypted using a rights management service; the real time multi-modal conversation relies on the rights management service to enforce restriction of the recording and playback per user's selection or the organizations' configuration policy; and the real time multi-modal conversation cannot be recorded if either party in the call decides to invoke an "off-the-record" conversation feature.

Real time multi-modal conversations where rights management according to embodiments may be implemented include, but are not limited to, instant messaging, email, voice telephony, video exchange, application sharing, data sharing, white-boarding, and similar. Such a real time multi-modal conversation may involve multiple parties, multiple endpoint devices for the same user, as well as multiple components that may be preserved in different manners.

The basic components of a system according to embodiments include client device 238 executing a communication application for user 236, client device 242 executing a communication application for user 244, and rights management server 234. The communication applications for users 236 and 244 facilitate multi-modal communication sessions 240 (over one or more networks) between the users 236 and 244 (as well as other users) based on organizational, system, and user selected parameters associated with quality, quantity and other aspects of the communications. For example, the parameters may include video resolution, voice quality, attachable document limitations, and similar factors. Modes of a communication session may also be determined based on organizational, system, or user selections at the beginning or during an existing communication session.

According to one embodiment, the client applications provide a core of the rights management solution. Client applications allow the user to access a rights management feature prior to or during conversations. During a bootstrapping process, client applications receive provisioning/rights management capability information from a communications server (e.g. a UC server). When the conversation rights feature is invoked, client applications communicate with the rights management server 234 to generate the appropriate rights management keys for a conversation and to ensure that the real time messages sent (e.g. the Real-time Transport Protocol "RTP" or Secure Real-time Transport Protocol "SRTP") are encrypted with usage licenses. Client applications receiving the protected content contact the rights management server 234 to help decrypt incoming rights managed messages. Rights management server 234 issues publishing licenses to client applications and enforces usage rights. When a client application receives an incoming INVITE with an SDP that indicates it is a rights protected session, then the client may contact the rights management server 234 and retrieve the usage license. The rights management server 234 may verify that the client is authorized to access the content and provide the usage licenses. If the usage license cannot be retrieved, the client may reject the INVITE with appropriate error code.

In an example scenario, users 236 and 244 may initiate a voice call, which may be elevated to a video conference with white-boarding feature based on the capability of their client devices (and communication applications) upon joining of a third user that wishes to add video and white-boarding capability. Based on this change, the communication session may be modified to the multi-mode version automatically or by user selection. Firstly, the joining of the third user may be allowed based on the assigned/user selected rights attributes of the initial conversation. If one or both of users 236 and 244 declared the conversation private, the third user may not be allowed to join unless specifically permitted by the users 236 and 244 (the third user may be provided a busy/unavailable signal or put on hold while the users 236 and 244 are notified of the request to join). Secondly, different aspects of the communication session may be recorded for later retrieval purposes (video recording, voice recording, white-board captures, and so on), which may be assigned permission attributes based on default or user assigned rights to the conversation. For example, the "private" declaration of the initial voice communication may be carried over to the additional modes, as well as any records (and attachments) created to preserve the conversation.

The rights management restrictions may also be applied based on an association of the different communication modes with particular people, groups, or organizations. As discussed above, the rights may be adapted for each communication mode being applied to different aspects of each communication mode (e.g. recordings of video communication, attachments of emails, and similar aspects).

According to some embodiments content (e.g. media) and shared files at a hosted sharing service may be escalated to a conference or similar communication implementing conversation rights. For example, if a conversation is applied restricted rights, shared files associated with that conversation may also be applied with similar restrictions flowing from the conversation to the stored files/documents.

While some of the rights may be applied statically (e.g. as defined by the organizational policies or by a user prior to a conversation) as mentioned before, other types may change based on conditions (e.g. user selection during a conversation, application of rights for one mode to a newly added mode based on communication mode type, etc.). Moreover, applicability of the rights management restrictions is not limited to communication applications only. In advanced communication modes such as email, white-boarding, data sharing, and so on, components of the communication such as attached data, recordings, etc. may be utilized by other applications like calendar applications, scheduling applications, word processing applications, spreadsheet applications, database applications, and comparable ones. Such applications may be local applications or distributed services executed by a central server and accessed through a browser or similar application. Any rights based restrictions assigned to documents (including recordings) generate by or associated with a conversation may be persisted when such documents are consumed by the non-communication applications.

Essential components of a system implementing conversation rights management are endpoints that are capable of understanding and complying with set permissions for a conversation. If an endpoint (physical or software) is incapable of understanding or complying with the set conversation rights, that endpoint may be denied participation in the conversation or the rights management feature may be disabled notifying subscribers that requested the rights.

Figure 3:
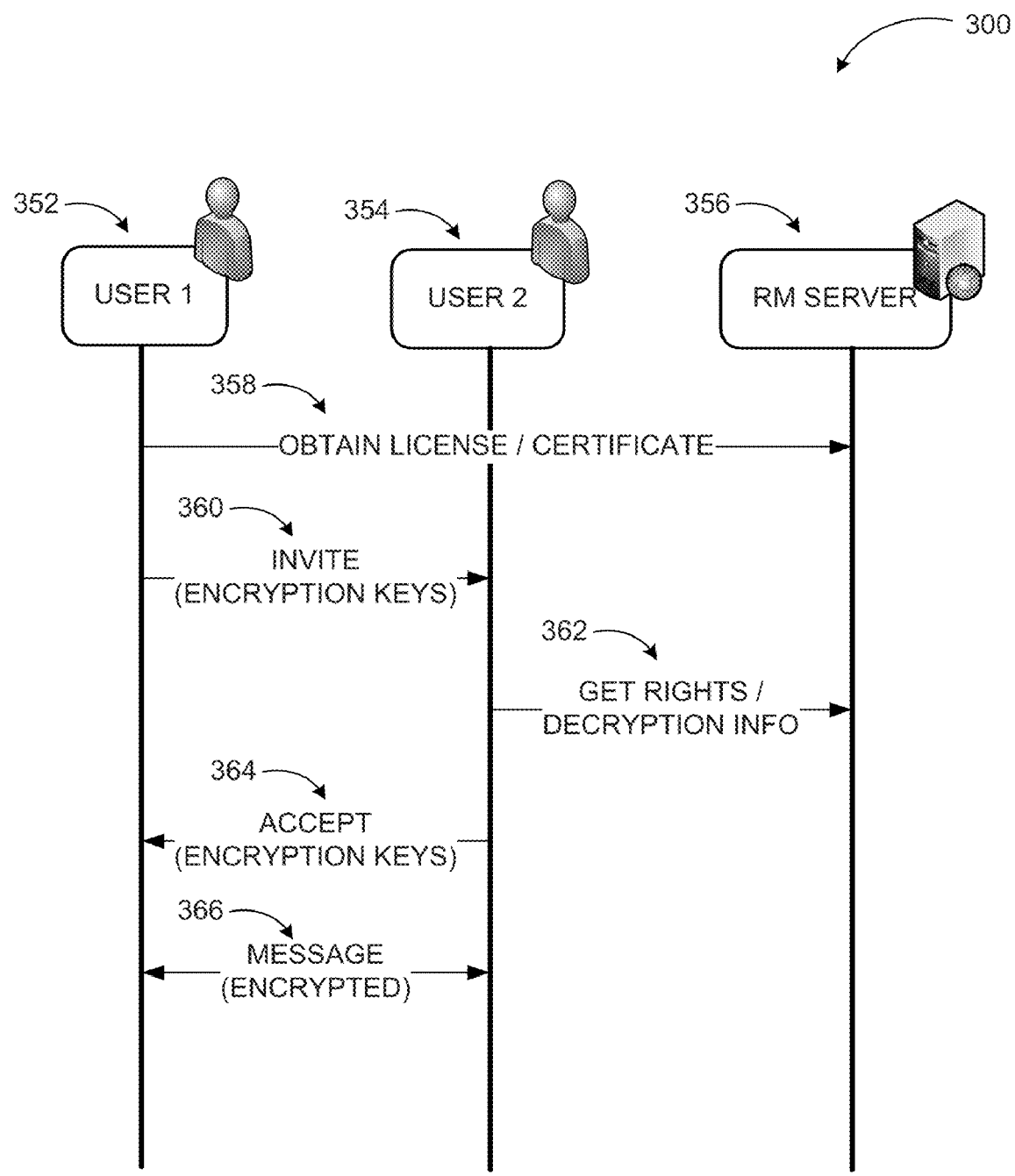
FIG. 3 is an action diagram illustrating interactions between different components of a communication system according to embodiments.

FIG. 3 is an action diagram illustrating interactions between different components of a communication system according to embodiments. According to an example scenario, client application 352 for user 1 begins with obtaining a license or certificate for a requested rights status from a rights management server 356 for a conversation about to be initiated (358). Client application 352 then originates a SIP INVITE that contains usage information relevant to the conversation rights (e.g. encryption keys) to client application 354 of user 2 (360). These may be included as part of a Session Description Protocol extension. Receiving client application 354 may ensure that the INVITE is accepted only when appropriate mechanisms are in place to ensure the conversation rights restriction(s) requested by user 1 can be enforced. If those mechanisms are in place, client application 354 obtains right/decryption information from rights management server 356 (362). Client application 354 then sends and ACCEPT message to client application 352 (364). This is followed by the exchange of encrypted messages between the client applications 352 and 354 facilitating the requested communication subject to the conversation rights restrictions.

Although not shown in the action diagram, the conversation rights restrictions may be created/modified during the conversation too following similar steps to actions 358, 360, 362, and 364. The restrictions may be applied to recordings of a portion or all of the conversation, any documents related to the conversation (e.g. those created during the conversation or exchanged as attachments during the conversation), as well as records of the conversation. For example, copying and pasting functionality for the conversation and related documents may be disabled if the conversation is not to be recorded. Restrictions may be defined separately for individual components (modes, related documents) of the conversation or inferred from one component for the others (e.g. using a schema). A history or similar record of the conversation may be limited to permitted users or not maintained at all. Furthermore, a special key may be employed to establish trust between client applications that they are all capable of handling the conversation rights. If one is incapable of handling the requested conversation rights restrictions, the originating client application may reject the incapable client application or modify an aspect of the conversation (e.g. revert to voice only from a voice and application sharing combination).

While many conversation rights restrictions and rules may be defined for different modes of communication and communication related documents, some example ones may include "off-the-record", "private", "restricted distribution", "limited-time-preservation", and comparable ones.

In addition to conferencing based UC systems, conversation rights management may also be applied to peer-to-peer communications. For example, in a conversation employing CCCP, the protocol may be modified to inform the focus that conversation rights are being applied. In such an example system, only leaders may be enabled to apply conversation rights; once the rights are applied, they may apply directly to the participants in the roster; and some rights may be disallowed when people join the conference anonymously or through a system incapable of complying with the requested rights (e.g. PSTN).

Moreover, in a conventional digital rights management scenario, rights are applied and enforced to documents individually or in groups. In a system according to embodiments, there are multiple physical endpoints and communication modalities. Thus, a schema for integrating conversation rights to these different aspects of a conversation may be employed. For example, with each applied conversation right, a manifest may be defined that introduces applicable communication modes, physical endpoints, duration of the conversation, associated data, and so on.

The above discussed scenarios, example systems, conversation rights restrictions, and configurations are for illustration purposes. Embodiments are not restricted to those examples. Other forms of restrictions, configuration, communication modes, and scenarios may be used in implementing conversation rights management in a similar manner using the principles described herein.

Figure 4:
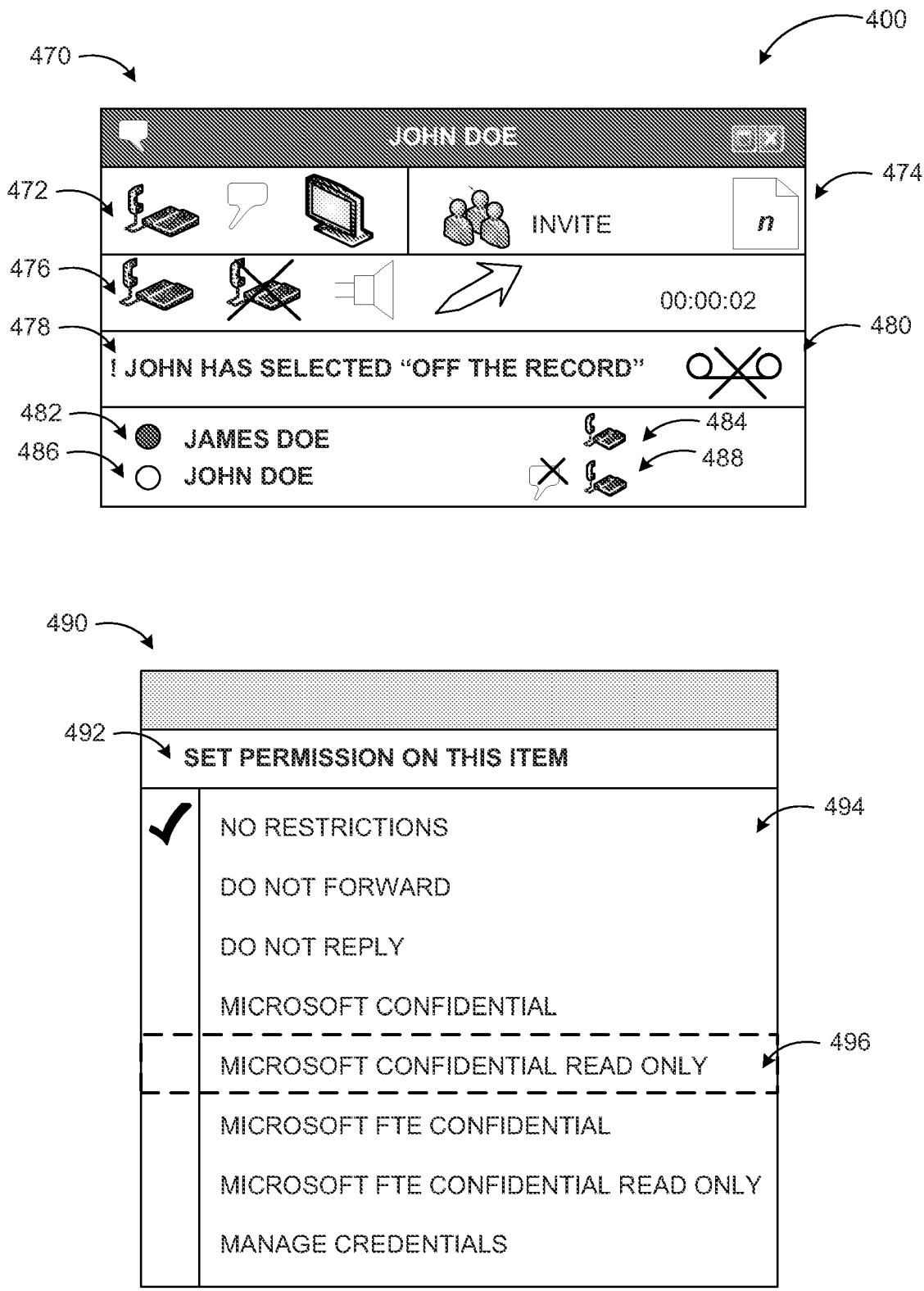
FIG. 4 illustrates screenshots of example user interfaces for managing conversation rights in a communication application.

FIG. 4 illustrates screenshots (400) of example user interfaces for managing conversation rights in a communication application. The elements and configuration of the user interface on screenshot 470 are for illustration purposes only and do not constitute a limitation on embodiments. A communication application capable of handling conversation rights may employ any user interface with other elements and configurations.

The user interface of screenshot 470 includes graphical representations of available communication modes in form of icons such as voice communication icon 472 and those next to it. Applications that may be relevant for recordings and other associated documents may be represented in form of icons such as icon 474. Commands and configuration options associated with the current conversation (e.g. hanging up, conferencing another user, sound options, and comparable ones) may also be displayed as icons (e.g. icon 476) or in other forms. A textual (478) and/or graphic (480) warning regarding a status of the conversation rights (e.g. "off-the-record") may be presented along with a listing of the participants and their status (radio buttons 482, 486 and icons 484, 488). In the example screenshot, icon 488 indicates that user "John Doe" is the one requesting the conversation be "off-the-record".

The user interface shown in screenshot 490 is a menu for selecting among predefined permissions for an aspect of a conversation. Upon selecting a set permissions command (492), the user may select among several tiers of permissions 494 such as no restrictions, forwarding or reply restrictions, company confidential, company confidential with read-only restriction (e.g. 496), divisional or departmental restrictions, and comparable ones. Other example permission levels may include "Do not escalate to conference", "Do not record", "Allow persons only" (no conference rooms), "Restrict to Fulltime Employees", etc. A conversation may also be created without participants according to some embodiments, and relevant participants may be added after permissions are set.

A user interface for a communication application capable of handling conversation rights may include additional or fewer textual and graphical elements, and may employ various graphical, color, and other configuration schemes to display different functionalities and associated rights management based restrictions.

Figure 5:
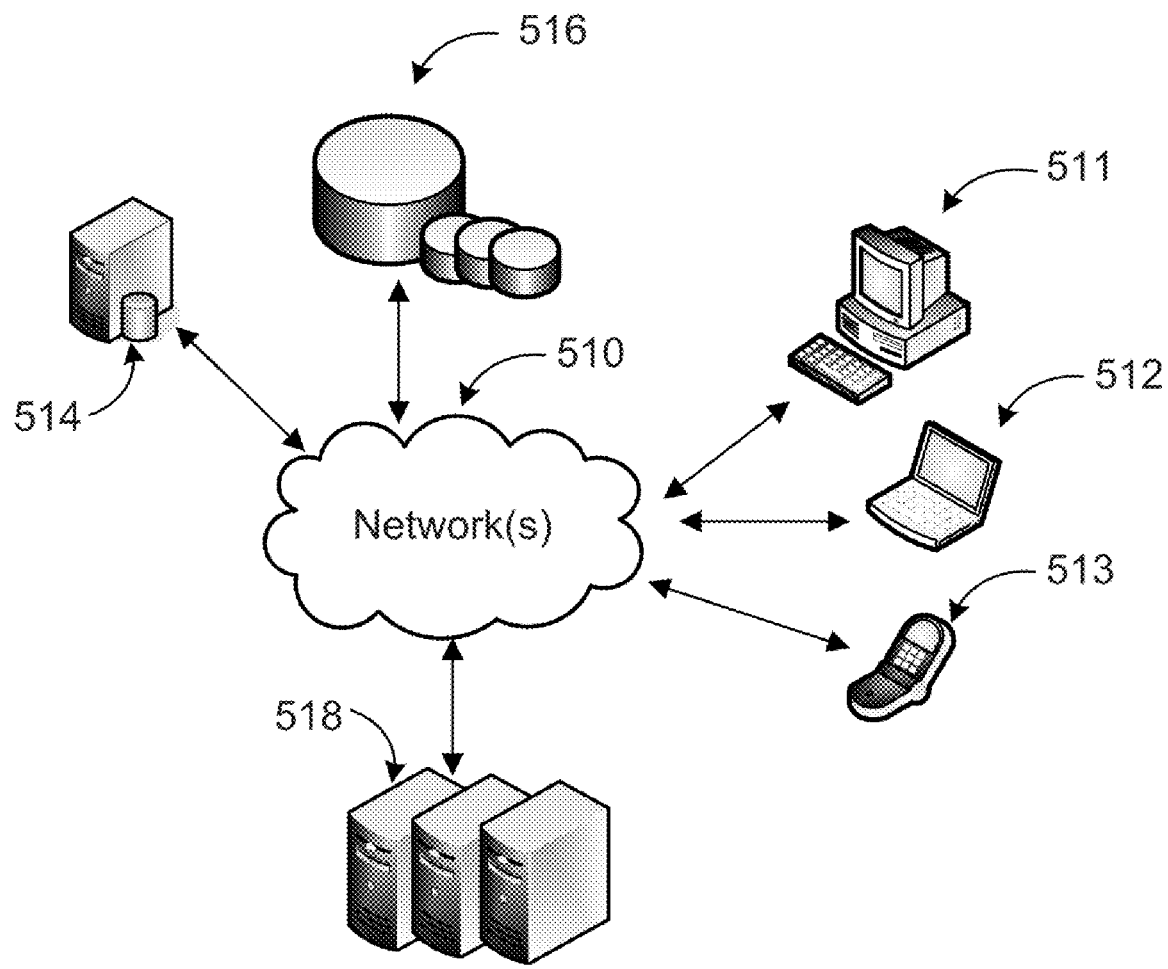
FIG. 5 is a networked environment, where a system according to embodiments may be implemented.

FIG. 5 is an example networked environment, where embodiments may be implemented. A platform providing communication services with conversation rights management may be implemented via software executed over one or more servers 518 such as a hosted service. The platform may communicate with client applications on individual computing devices such as a cellular phone 513, a laptop computer 512, and desktop computer 511 (client devices) through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 511-513 are used to facilitate communications through a variety of modes between subscribers of the communication system. One or more of the servers 518 may manage conversation rights based on default definitions or user selections for currently used communication modes. Information associated with subscribers and facilitating communications with conversation rights enforcement may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system with conversation rights management. Furthermore, the networked environments discussed in FIG. 5 are for illustration purposes only. Embodiments are not limited to the example applications, modules, or processes.

Figure 6:
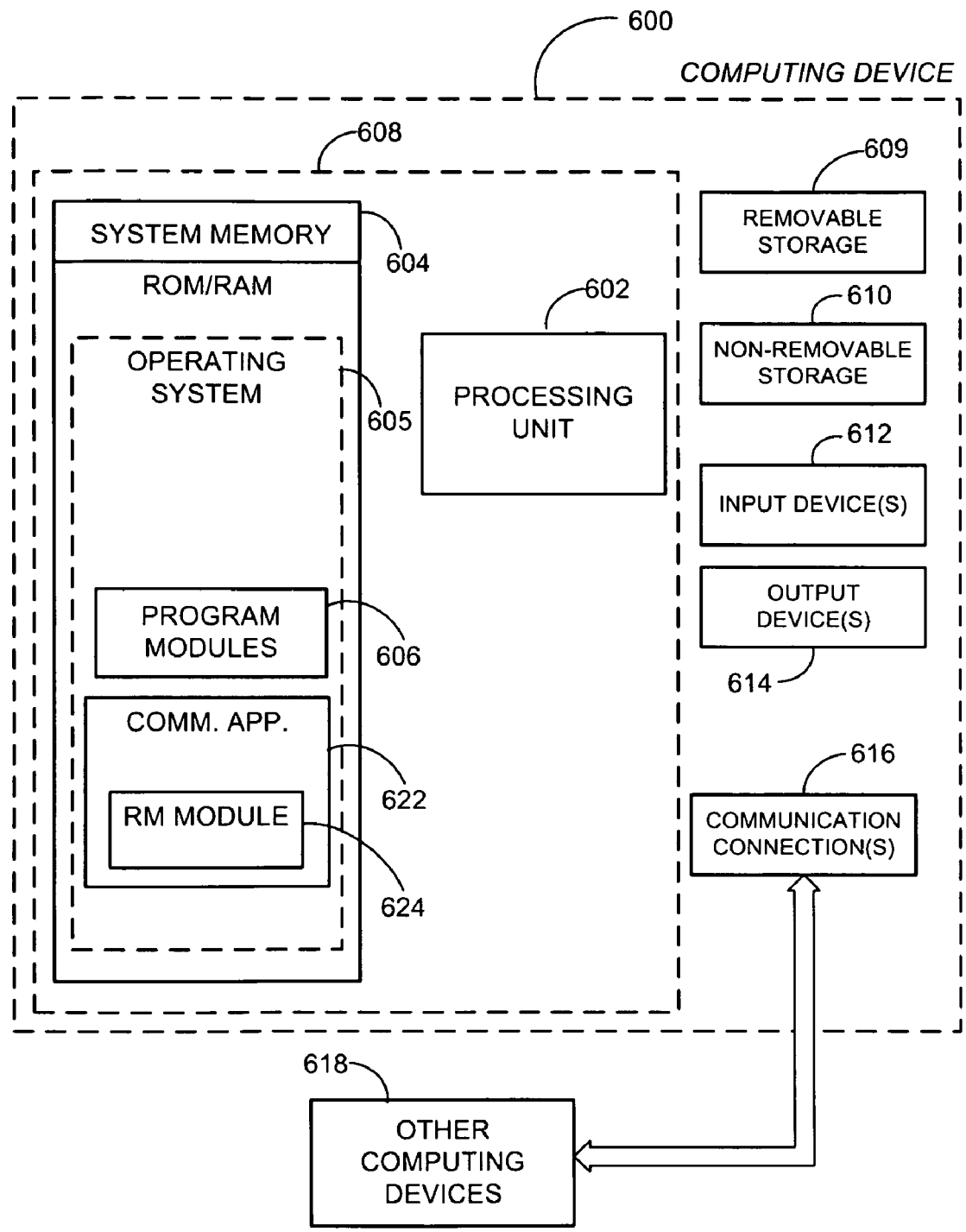
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a rights management server as part of a communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and rights management module 624.

Communication application 622 may be part of a service that facilitates communication through various modalities between client applications, servers, and other devices. Rights management module 624 may manage and enforce conversation rights associated with different communication modes and related documents as discussed previously. Rights management module 624 and communication application 622 may be separate applications or integral modules of a hosted service that provides enhanced communication services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
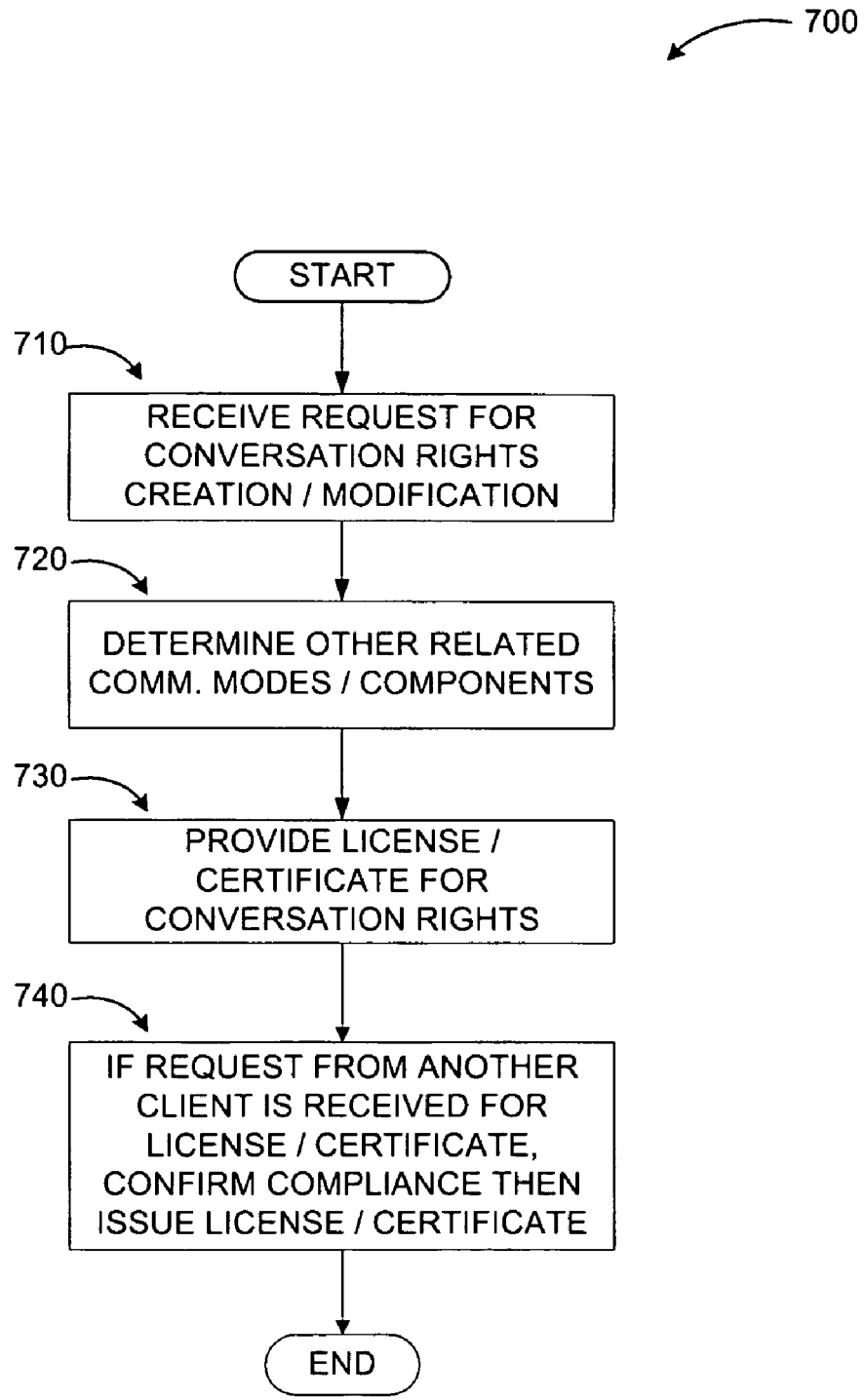
FIG. 7 illustrates a logic flow diagram for managing conversation rights in a communication system according to embodiments.

FIG. 7 illustrates a logic flow diagram for process 700 of managing conversation rights in a communication system according to embodiments. Process 700 may be implemented as part of a communication system that facilitates multiple communication modes.

Process 700 begins with operation 710, where a request is received from a client application for creating or modifying conversation rights for a new conversation or an existing conversation. The request may pertain to the entire conversation or a portion of it (e.g. certain modes, select components, or a defined temporal portion). At operation 720, related communication modes and/or components are determined, especially if the request is for a portion of the conversation. The determination at operation 720 may include a decision whether to apply the same requested restrictions to the related modes/components and how to apply those if they are to be applied (for example, recording restrictions may be applied differently to voice conversations than to email exchanges).

At operation 730, a license/certificate may be provided to the requesting client application (e.g. encryption keys) confirming the acceptance of the rights management request and providing the requesting client application with a tool to enforce those restrictions. At operation 740, a request may be received for the license/certificate (e.g. decryption keys) by a participant of the same conversation, which may have received an invite message from the original client application. According to some embodiments, the rights management server may confirm that the participant client application is capable of enforcing the conversation rights and/or is a trusted application, before providing the license/certificate, which enables the participant client application to exchange messages with the original client application and facilitate the conversation while enforcing the rights requested by the original client application.

The operations included in process 700 are for illustration purposes. A communication service for managing conversation rights may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for implementing conversation rights management, the method comprising:
   receiving a request for creating a conversation rights based restriction for a communication session at a rights management server;
   providing a license to a requesting first client application;
   receiving another request from a second client application for the license, the second client application being invited to participate in the communication session with the first client application;
   providing the license to the second client application in response to confirming the second client application is a trusted application and is capable of enforcing the conversation rights based restriction for the communication session;
   notifying a third application of a denial to the license upon detecting the third application having a disabled rights management feature; and
   facilitating the communication session between the first and the second client applications according to organizational, system, and user selected parameters associated with quality and quantity aspects of the communication session including at least one from a set of: a video resolution, a voice quality, and attachable document limitations.

2. The method of claim 1, wherein the license is at least one encryption key for use by the first and second client applications to encrypt and decrypt messages exchanged during the communication session.

3. The method of claim 1, wherein the request for creating conversation rights based restriction is received at a time point that is one of: before the communication session is initiated and during the communication session, and wherein the conversation rights based restriction is applied to at least one from a set of: a recording of the communication session, a record associated with the communication session, and a document associated with the communication session.

4. The method of claim 1, further comprising:
   receiving a further request from one of the first application and the second application to modify the conversation rights based restriction; and
   providing a modified license to the requesting application.

5. The method of claim 1, wherein the communication session is escalated from one of stored content and shared data, and the conversation rights based restriction associated with the communication session is applied to the one of stored content and shared data, from which the communication session is escalated.

6. The method of claim 1, wherein the conversation rights based restriction is employed to determine at least one from a set of: whether a user is permitted to join the communication session, whether the communication session is permitted to be recorded, access permissions for at least one from a set of: a recording of the communication session, a record associated with the communication session, and a document associated with the communication session.

7. The method of claim 1, wherein the conversation rights based restriction is applied to a document associated with the communication session such that the restriction is persisted when the document is consumed by a non-communication application including one from a set of: a word processing application, a spreadsheet application, a presentation application, a calendaring application, a scheduling application, and an image processing application.

8. The method of claim 1, wherein the communication session is a multi-modal communication session including at least one from a set of: a voice communication, a video communication, a white-boarding session, a data sharing session, an application sharing session, an instant messaging session, and an email exchange.

9. The method of claim 8, wherein the conversation rights based restriction is defined for one mode of the communication session and applied to all modes.

10. The method of claim 1, wherein the conversation rights based restriction includes one from a set of: "off-the-record", "private", "restricted distribution", "do not forward", "do not reply", "company confidential", "company confidential with read-only restriction", "distribution restricted to division", "distribution restricted to department", "do not escalate to conference", "do not record", "allow persons only", "restrict to fulltime employees", and "limited time preservation".

11. The method of claim 1, wherein the license is an encryption key, and wherein at least one mode of the communication session and at least one document associated with the communication session are encrypted using the encryption key during an exchange between participants in the communication session.

12. A communication system for implementing conversation rights management, the system comprising:
a communication server configured to facilitate multi-modal communications between endpoints of the system;
a rights management server configured to:
provide an encryption key to a first endpoint in response to a request from the first endpoint;
receive a request from a second endpoint prompted by an invite sent by the first endpoint to the second endpoint;
determine if the second endpoint is a trusted endpoint and capable of enforcing conversation rights requested by the first endpoint; and
if so:
specify recording restrictions separately in a multi-modal communication session for components of the multi-modal communication session including modes and related documents transmitted through the encrypted messages;
insert recording restrictions in decryption information enforced on the encrypted messages; and
provide the decryption information to a second endpoint such that the encrypted messages are exchanged between the first and second endpoints to facilitate the multi-modal communication session;
else:
provide an error message to the second endpoint preventing the second endpoint from joining the multi-modal communication session.

13. The system of claim 12, wherein the first and the second endpoints communicate with the rights management server employing Session Initiation Protocol (SIP), and wherein the encrypted messages are exchanged between the first and the second endpoints employing Real-time Transport Protocol (RTP).

14. The system of claim 13, wherein the conversation rights information is exchanged between the first endpoint, the second endpoint, and the rights management server employing Session Description Protocol (SDP) extensions, and wherein an endpoint attempting to join the multi-modal communication but incapable of complying with the applied conversation rights is denied access.

15. The system of claim 12, wherein the second endpoint is determined to be a trusted endpoint through authentication by a trust server of the communication system.

16. The system of claim 12, wherein the multi-modal communication is created without participants and relevant participants are added following an implementation of the conversation rights to the multi-modal communication, and wherein a conversation rights feature not implementable by one of the first and second endpoints is disabled.

17. A computer-readable memory device with instructions stored thereon for managing conversation rights through a multi-modal communication application, the instructions comprising:
providing a user interface to enable a user to initiate a communication session by selecting at least one communication mode, wherein the user is further enabled to specify a conversation rights status for the communication session;
obtaining at least one encryption key from a rights management server to be employed for enforcing the specified conversation rights status on the communication session;
specifying recording restrictions separately in the communication session for components of the communication session including modes and related documents;
notifying another communication application of a denial to the at least one encryption key upon determining the other communication application having a disabled rights management feature;
sending an invite message to the other communication application including the at least one encryption key upon determining the other communication application having an enabled rights management feature;
upon receiving a successful acceptance message from the other communication application, facilitating the communication session by exchanging messages encrypted with the at least one encryption key;
facilitating the communication session according to organizational, system, and user selected parameters associated with quality and quantity aspects of the communication session including at least one from a set of: a video resolution, a voice quality, and attachable document limitations;
enforcing the recording restrictions on the communication session.

18. The computer-readable memory device of claim 17, wherein the communication session is held in a peer-to-peer communication system, and wherein a portion of applicable conversation rights are disabled based on capabilities of participating endpoints.

19. The computer-readable memory device of claim 17, wherein the user interface is further configured to display a conversation rights status of an active communication session and to enable the user to modify the conversation rights status of an active communication session without interrupting the communication session employing at least one of a graphical scheme and a color scheme.

20. The computer-readable memory device of claim 17, wherein with each applied conversation right, a schema is defined introducing applicable communication modes, physical endpoints, duration of the communication session, and associated data.

* * * * *